United States Patent [19]
Granger

[11] Patent Number: 5,991,511
[45] Date of Patent: *Nov. 23, 1999

[54] APPEARANCE-BASED TECHNIQUE FOR RENDERING COLORS ON AN OUTPUT DEVICE

[75] Inventor: Edward M. Granger, Rochester, N.Y.

[73] Assignee: Light Source Acquisition Company, Grandville, Mich.

[*] Notice: This patent is subject to a terminal disclaimer.

[21] Appl. No.: 08/871,487

[22] Filed: Jun. 9, 1997

Related U.S. Application Data

[63] Continuation of application No. 08/595,404, Feb. 5, 1996, Pat. No. 5,650,942
[60] Provisional application No. 60/011,064, Feb. 2, 1996.

[51] Int. Cl.$^6$ ................................ H04N 1/60; G03F 3/08
[52] U.S. Cl. .................. 395/109; 395/101; 358/518; 358/520; 358/523; 382/167; 382/162
[58] Field of Search ..................... 395/109, 101; 358/518–521, 523, 500; 382/167, 162; 355/38

[56] References Cited

U.S. PATENT DOCUMENTS

| | | | |
|---|---|---|---|
| 3,986,202 | 10/1976 | Granger | 358/4 |
| 4,843,573 | 6/1989 | Taylor et al. | 395/131 |
| 4,929,978 | 5/1990 | Kanamori et al. | 355/38 |
| 5,231,504 | 7/1993 | Magee | 358/500 |
| 5,243,414 | 9/1993 | Dalrymple et al. | 358/500 |
| 5,309,257 | 5/1994 | Bonino et al. | 358/504 |
| 5,313,291 | 5/1994 | Appel et al. | 358/501 |
| 5,317,425 | 5/1994 | Spence et al. | 358/504 |
| 5,323,249 | 6/1994 | Liang | 358/518 |
| 5,450,216 | 9/1995 | Kasson | 358/518 |
| 5,463,480 | 10/1995 | MacDonald et al. | 358/520 |
| 5,650,942 | 7/1997 | Granger | 364/526 |

FOREIGN PATENT DOCUMENTS

| | | |
|---|---|---|
| 0 750 419 | 12/1996 | European Pat. Off. . |
| 8-111784 | 4/1996 | Japan . |

OTHER PUBLICATIONS

Granger, E.M. et al., "Visual Chromaticity Transfer Functions," 1973 Annual Meeting, Optical Society of America, (Abstract) pp. 1287–1288 (Color II, Contributed Papers (C.J. Bartleson, Presider)).

Granger, E.M., "Subjective Assessment and Specification of Color Image Quality," *Image Assessment Spec. Opt. Soc. Am.* 1974, pp. 86–92.

Granger, Edward M., "A Summary Measure of Image Quality," SPIE vol. 432 (1983), pp. 340–347.

Granger, Edward M., "Visual Limits to Image Quality," SPIE vol. 528, *Digital Image Processing* (1985), pp. 95–102.

Granger, E.M., "Uniform Color Space as a Function of Spatial Frequency," SPIE vol. 1913 (1993), pp. 449–461.

Granger, E.M., "Is CIE L*a*b* Good Enough for Desktop Publishing?" SPIE vol. 2170, *Device–Independent Color Imaging*, pp. 144–148 (Eric Walowit, Chair/Editor; Feb. 7–8, 1994, San Jose, CA).

(List continued on next page.)

*Primary Examiner*—Tariq R. Hafiz
*Assistant Examiner*—Tuan Q. Dam
*Attorney, Agent, or Firm*—Townsend and Townsend and Crew LLP

[57] ABSTRACT

A target output device such as a printer is characterized in a manner that primary colorant amounts can be determined on the basis of a pair of chromaticity coordinates in a chromaticity space having a pair of chromaticity coordinates that span hue and chroma (saturation) and a luminance correlate (monotonic function of luminance). Lightness (or darkness) of the colors is handled largely independently. This makes it possible to store the colorant information in a two-dimensional table indexed by chromaticity coordinates. The information in the table is for colors that are characterized by the highest luminance that the target printer is capable of rendering for a given chromaticity (hue and chroma).

18 Claims, 9 Drawing Sheets

OTHER PUBLICATIONS

Granger, E.M., "ATD, Appearance Equivalence, and Desktop Publishing," SPIE vol. 2170, *Device–Independent Color Imaging*, pp. 163–168 (Eric Walowit, Chair/Editor; Feb. 7–8, 1994, San Jose, CA).

Granger, E.M., "A Constant–Bandwidth Grating–Lens Spectrometer," SPIE vol. 2413, *Color Hard Copy and Graphic Arts IV*, pp. 333–338 (Jan Bares, Chair/Editor; Feb. 6–10, 1995, San Jose, CA).

Granger, E.M., "Gamut Mapping for Hard Copy Using the ATD Color Space," SPIE vol. 2414, *Device–Independent Color Imaging II*, pp. 27–35 (Eric Walowit, Chair/Editor; Feb. 7–8, 1995, San Jose, CA).

Benzschawel et al., "ATD: Toward a Uniform Color Space," *Color Research & Appl.*, vol. 9, No. 3, pp. 133–140.

APPEARANCE-BASED TECHNIQUE FOR RENDERING COLORS ON AN OUTPUT DEVICE

This application is a continuation of U.S. application Ser. No. 08/595,404, filed Feb. 5, 1996, now U.S. Pat. No. 5,650,942, which claims priority from U.S. Provisional Application No. 60/011,064, filed Feb. 2, 1996, the entire disclosures of which are hereby incorporated by reference.

BACKGROUND OF THE INVENTION

The present invention relates generally to color management in graphic arts (GA) publishing, and more specifically to techniques for rendering specified colors.

Reproduction of images in today's publishing industry almost always involves their intermediate storage in electronic form. Numerical values encode the colors in such images. Publishers typically deliver encoded images and text to printing contractors, who use production grade printing devices to produce books, magazines, or other printed materials. The central problem for color management is to make published images look the way the designer intended.

Current practice includes many techniques that address this problem. For GA publishing to meet designers' expectations about color, designers must first express those expectations. While they may specify colors using a standard color identification scheme such as the CIE XYZ system or the Pantone-system, it is just as likely that they will point to an existing object (for example, a photograph) or a video display and say "Make it look like that."

Given that what counts is appearance, numerical encoding schemes should facilitate, rather than hinder, the process of obtaining printed output that "looks right." Unfortunately, the multiplicity of encodings is a source of problems. For more than a century scientists have known that human eyes have three kinds of receptors. Spectral response curves characterize these kinds of receptors, but they can loosely be said to respond to the three basic colors, red, green, and blue. Humans perceive the color of light arriving at the eye on the basis of the different responses to that light by the three kinds of receptors.

FIG. 1 is a simplified view showing how different colors can be obtained by combinations of three primaries. The drawings are simplified in the sense that a gradation of colors between a given pair of primaries can be obtained by different combinations of the adjacent primaries. The lefthand portion of FIG. 1 shows the case of additive primaries, red (R), green (G), and blue (B). In principle, the appearance of any color can be simulated by starting with black (no light), and adding various proportions of red, green, and blue light (R, G, and B). When the amounts of R, G, and B are equal and at the maximum intensity, the result is white light. As can be seen, cyan can be obtained by combining G and B, magenta by combining R and B, and yellow by combining R and G.

One advantage of RGB is that it represents one model of human vision, and can form the basis for designing input devices (such as scanners, calorimeters, and digital cameras) that imitate the eye, and output devices (such as monitors) that fool the viewer into believing that many colors are being seen. A computer monitor, for example, simulates colors by exciting red, green, and blue phosphors to emit at different intensities. A scanner imitates color vision by measuring the intensities of red, green, and blue light reflected from a piece of artwork or a photograph or transmitted through a slide.

The righthand portion of FIG. 1 shows the case of subtractive primaries. In principle, any color can be simulated by starting with white light, and removing selected amounts of red, green, and blue light. This forms the basis of color printing, where a portion of white light reflecting from a printed page is removed by filtering pigments, commonly known as inks or dyes. Red is removed by a cyan (C) ink, green by a magenta (M) ink, and blue by a yellow (Y) ink. C, M, and Y are sometimes referred to as the primary colorants. As can be seen, green can be obtained by a combination of C and Y, red by a combination of M and Y, and blue by a combination of C and M. These combinations are achieved by covering the area with different relative amounts of the primary colorants. Colorant amounts (or colorant values) are often expressed in dot percentages.

In principle, some combination of C, M, and Y should give a neutral color (gray). In most dye sets, a neutral color is achieved with a C:M:Y proportion of approximately 5:4:4, so that a color approaching black can be obtained with approximately 100% C, 80% M, 80% Y. High-quality printing, however, typically requires a separate black ink.

A color can be expressed in terms of its R, G, and B values, and so can be can be thought of as being located at a point in a space, called the RGB space, where its coordinates correspond to its R, G, and B values. The RGB space is referred to as a tristimulus space since a color can be defined by three additive primaries. C, M, and Y can also be thought of as defining a tristimulus space.

There are many tristimulus spaces in addition to RGB and CMY. An international commission on illumination, known as CIE (Commission Internationale de l'Éclarage in French) defined a standard tristimulus space (known as the CIE XYZ color space) in terms of three imaginary primaries X, Y, and Z based on the human visual system.

A derived space is the xyY color space, which separates chromaticity (color-related) attributes, x and y, from a luminance-related (brightness) attribute, Y. The Yuv system, standardized in 1960, is a further derivative of XYZ. Like xyY, it has a luminance component (Y) and a two-dimensional chromaticity component (uv). Such systems are called chromaticity spaces. The Yuv system was designed to allow measurement of color differences, and exhibits a correlation between "distance" computed from coordinate differences and subjective color differences reported by observers.

FIG. 2 shows what is known as the CIE (x, y) chromaticity diagram, which contains a closed contour in x-y space. The contour includes a horseshoe-shaped line, known as the spectrum locus, with its ends joined by a straight line, called the purple line. Points on the spectrum locus represent pure colors (single wavelength), with the lefthand endpoint corresponding to 380 nm, the righthand endpoint 770 nm, and the uppermost point 520 nm. The contour encloses all human-perceptible colors. A color outside the contour has zero luminance or is indistinguishable to a human observer from a color on the contour.

Also drawn on this plot are four points, designated $R_{meta}$, $G_{meta}$, $B_{meta}$ and D65. The first three are a particular set of additive primaries, referred to as meta RGB primaries, and D65 represents a particular white point. The meta RGB primaries (often referred to below simply as R, G, and B) are related to CIE XYZ by a predetermined (output device independent) linear transformation characterized by a non-singular (i.e., invertible) 3×3 transformation matrix.

A visual alternative to specifying color coordinates is to pick a color from a collection of carefully produced sample patches. The Munsell system was the first systematic approach to this kind of color specification. Munsell designed the patches to represent perceptually equal steps in each of three characteristics of color: hue (position around the color wheel), chroma (saturation, or perceived difference from a neutral color at the same brightness), and value (brightness). The Pantone system is a modern implementation of the same basic idea. Each patch in such a system has specified coordinates in the CIE XYZ system. Color patches can be thought of as a visual front end to CIE XYZ.

The CIE XYZ system classifies colors independently of the devices used to measure or reproduce them. Most GA publishing devices use numerical encodings with no clear relationship to XYZ or any other device-independent system. This means that there is no GA color exchange space. That is, there is no system of color specification that can conveniently be used with all GA publishing devices.

Desktop publishing equipment plays an increasingly large role in GA publishing. While the technological limitations of equipment for DTP are undoubtedly temporary, they pose particular problems for current GA publishing. In particular, the computational complexity of the Luv and Lab color spaces make them difficult to deal with in real time on DTP equipment.

The following publications provide additional background and are incorporated by reference: E. M. Granger, "Is CIE L*a*b Good Enough for Desktop Publishing?", Device-Independent Color Imaging, *SPIE,* Vol. 2170, pp. 144–148 (Feb. 7–8, 1994, San Jose, Calif.); E. M. Granger, "ATD, Appearance Equivalence, and Desktop Publishing," Device-Independent Color Imaging, SPIE, Vol. 2170, pp. 163–168 (Feb. 7–8, 1994, San Jose, Calif.); and E. M. Granger, "Gamut Mapping for Hard Copy Using the ATD Color Space," Device-Independent Color Imaging II, *SPIE,* Vol. 2414, pp. 27–35 (Feb. 7–8 1995, San Jose, Calif.).

SUMMARY OF THE INVENTION

The present invention provides techniques for reproducing color faithfully, even on output devices having limited gamut. The invention is computationally efficient, and is robust in the face of process variations at the output stage. The colors achieved using the invention are particularly rich, including in the dark regions, which are notoriously difficult to render.

In brief, the invention characterizes a target output device in a manner that primary colorant values can be determined on the basis of a pair of chromaticity coordinates in a chromaticity space having a pair of chromaticity coordinates that span hue and chroma (saturation) and a luminance correlate (monotonic function of luminance). Lightness (or darkness) of the colors is handled largely independently. This makes it possible to store the colorant information in a two-dimensional table indexed by chromaticity coordinates. A table that stores values for all possible chromaticity coordinate pairs allows the determination to be made by lookup alone, and the table is still of a manageable size. Even if a smaller table is used, colorant information can be obtained by a two-dimensional interpolation of table entries, which is computationally efficient.

This contrasts with prior art schemes that store information in a three-dimensional table. It is generally impractical to store colorant information for all possible combinations of color coordinates, which makes it necessary to derive values by interpolation in three dimensions, which is computationally inefficient.

In a specific embodiment, primary colorant values for the target device are determined as a function of the chromaticity coordinates, and are combined with the luminance correlate value to provide commands for the output device. If the input colors are specified in a tristimulus space, they are mapped to the chromaticity space. To accommodate gamut mapping, chroma may be reduced and new primary colorant amounts determined.

In a specific embodiment, where the target output device is a printer, the function that provides colorant values as a function of the chromaticity coordinates is derived by printing a set of color samples with the target printer, measuring the samples with a color measurement device, converting the measured values to coordinates in the chromaticity space, and constructing a table, indexed by the two chromaticity coordinates, where each entry includes primary colorant values and the luminance coordinate. The table entries are typically determined by interpolating the values from the measured color samples.

The set of color samples is sometimes referred to as the umbrella chart, the colors referred to as the umbrella colors, and the table referred to as the umbrella table. The umbrella colors are preferably characterized by the highest luminance that the target printer is capable of rendering for a given chromaticity (hue and chroma). Where the target printer includes a set of primary colorants (e.g., CMY or CMYOG), the umbrella colors include a single primary colorant at values from 0 to 100% dot area or pairwise combinations of the primary colorants over that range. Boundary colors are those for which one or the pair of the primary colorants has the greatest chroma that the target printer can render for that colorant or colorant pair at the given hue angle.

The present invention provides a dark model methodology where the actual darkness, which is limited, is a desired function of specified darkness, which may be outside the target device's capability. This permits a smooth transition from a linear region to one where the actual darkness falls away smoothly. Chroma is reduced for increasing darkness to allow a smooth transition. A darkness table stores colorant and chroma reduction information.

In a specific embodiment, gamut mapping between output devices is modelled on the non-linear way the human viewer adapts to visual stimuli. This is in contrast to the prior art techniques such as compressing or clipping, and provides a smooth transition between cases where the specified pixel values are within the gamut of the output device and cases where the specified pixel values are outside the gamut of the output device. This is advantageously done using a parabolic approximation.

A further understanding of the nature and advantages of the present invention may be realized by reference to the remaining portions of the specification and the drawings.

DESCRIPTION OF SPECIFIC EMBODIMENTS

Hardware System Overview

Figure 1:
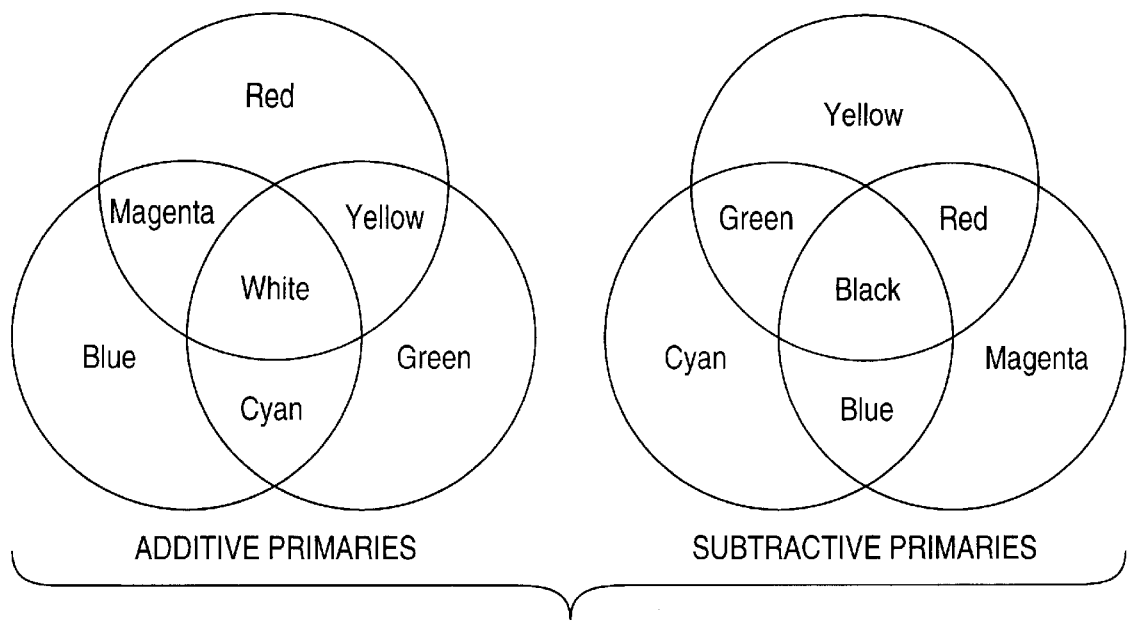
FIG. 1 is a simplified view showing how different colors can be obtained by combinations of three additive primaries (lefthand portion) and three subtractive primaries (righthand portion)
Figure 2:
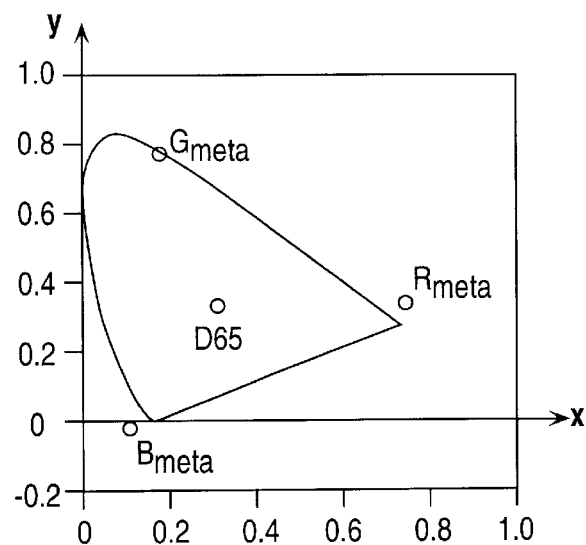
FIG. 2 is the CIE (x, y) chromaticity diagram.
Figure 3:
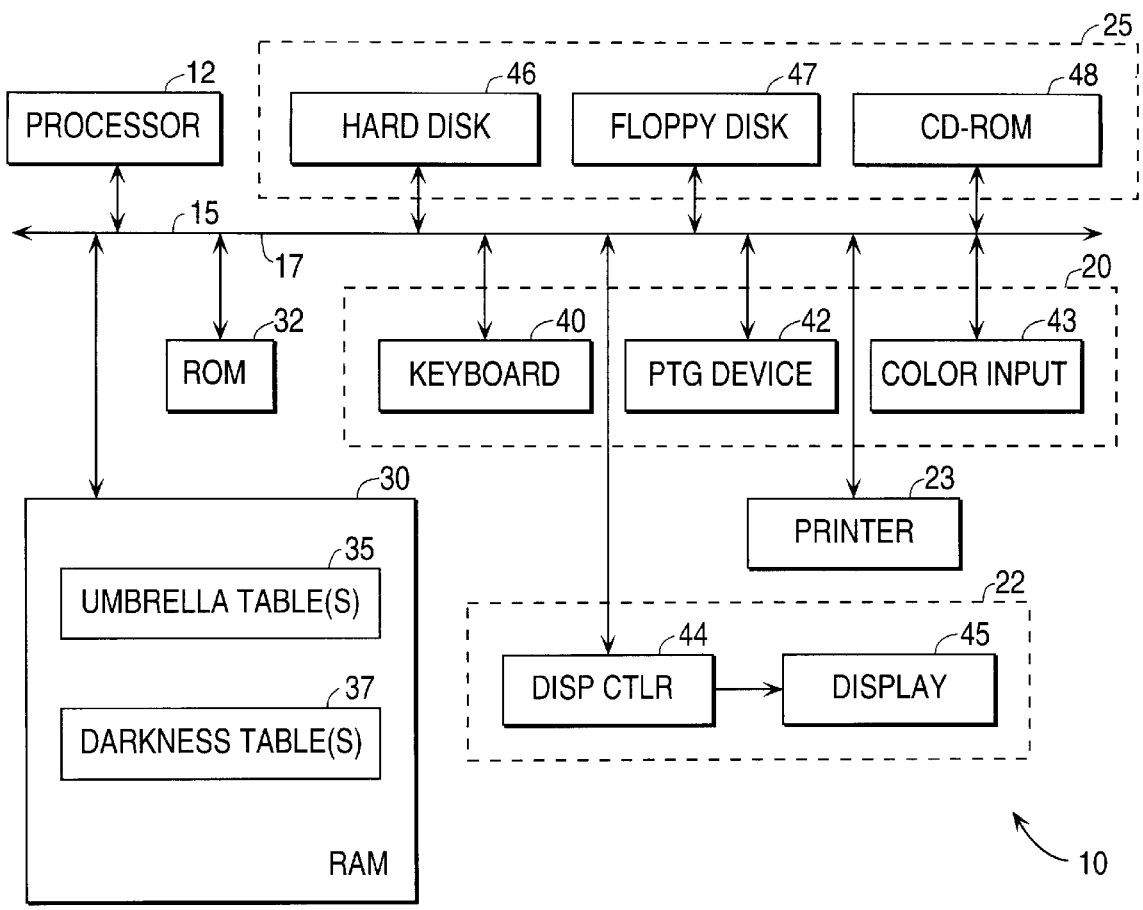
FIG. 3 is a block diagram of a computer system in which the present invention may be embodied.

FIG. 3 is a simplified block diagram of a computer system 10 in which the present invention may be embodied. In accordance with known practice, the computer system includes a processor 12 that communicates with a number of peripheral devices via a bus subsystem 15. These peripheral devices typically include a memory subsystem 17, a user input facility 20, a display subsystem 22, output devices such as a printer 23, and a file storage system 25.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 15 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The computer system may be a desktop system or a portable system.

Memory subsystem 17 includes a number of memories including a main random access memory (RAM) 30 and a read only memory (ROM) 32 in which fixed instructions are stored. In the case of Macintosh-compatible personal computers this would include portions of the operating system; in the case of IBM-compatible personal computers, this would include the BIOS (basic input/output system).

In accordance with certain embodiments of the present invention, tables characterizing a selected target output device, or multiple target output devices, are constructed and stored for use in rendering specified colors. For each target device, these include a table (or a set of tables) 35, referred to as the umbrella table(s), and a table (or a set of tables) 37, referred to as the darkness table(s). These tables and their methods of construction and use will be described in detail in later sections. At this point, it suffices to note that the umbrella table stores primary colorant information specifying how colors of a given hue and chroma should be rendered, while the darkness table stores colorant information specifying how to darken such colors when necessary.

User input facility 20 typically includes a keyboard 40 and may further include a pointing device 42 and a color input device 43. The pointing device may be an indirect pointing device such as a mouse, trackball, touchpad, or graphics tablet, or a direct pointing device such as a touch-screen incorporated into the display. The color input device may be a scanner that produces a bitmap image corresponding a photographic print or slide, a digital camera that produces a bitmap image of a scene, or might be a color measurement device that provides colorimetric or spectrometric information about a single color.

Display subsystem 22 typically includes a display controller 44 and a display device 45 coupled to the controller. The display device may be a cathode ray tube (CRT), a flat-panel device such as a liquid crystal display (LCD), or a projection device. Display controller provides control signals to the display device and normally includes a display memory (not shown in the figure) for storing the pixels that appear on the display device.

The file storage system provides persistent (non-volatile) storage for program and data files, and typically includes at least one hard disk drive 46 and at least one floppy disk drive 47. There may also be other devices such as a CD-ROM drive 48 and optical drives. Additionally, the system may include hard drives of the type with removable media cartridges. As noted above, one or more of the drives may be located at a remote location, such as in a server on a local area network or at a site on the Internet's World Wide Web.

Preferred Chromaticity Space

As will be described below, the present invention operates by transforming input colors to a chromaticity space where colorant values and neutral components for a target output device can be determined. The chromaticity space is device-independent, but the operations carried out in the space are tailored to a particular target output device and require a characterization of the target output device. In a specific implementation, the target output device is a 3M MatchPrint brand CMYK printer, which is widely used in the GA industry.

The chromaticity space should have the property that it includes a pair of chromaticity coordinates that span hue and chroma, and a luminance correlate that is substantially independent of the chromaticity coordinates. CIE xyY and CIE Yuv and derivatives thereof are suitable chromaticity spaces. CIE Lab and Luv (1976) would generally not be suitable since L is heavily correlated with a and b and with u and V.

The preferred chromaticity space is derived from the meta RGB space as follows. As mentioned above, the meta RGB primaries (often referred to below simply as R, G, and B) are related to CIE XYZ by a predetermined linear transformation characterized by a non-singular 3×3 transformation matrix. Specifically, so that meta RGB and CIE XYZ are related by the following set of equations (RGB to XYZ):

$$X=0.257*R+0.066*G+0.049*B$$

$$y=0.115*R+0.286*G-0.009*B$$

$$Z=-0.026*R+0.015*G+0.438*B$$

and the inverse transformation (XYZ to RGB):

$$R=4.271*X-0.963*Y-0.500*Z$$

$$G=-1.709*X+3.878*Y+0.271*Z$$

$$B=0.314*X-0.189*Y+2.243*Z$$

These equations (and their corresponding matrices) assume that the meta RGB values are normalized to lie in the range 0–255 and that the XYZ values are normalized to lie in the range 0–100. Given that the meta RGB primaries lie on or just outside the CIE (x, y) chromaticity boundary, the meta RGB space spans the gamut of known colorants.

In a preferred embodiment, it is convenient to define a chromaticity space in terms of the meta RGB space as follows:

$$V=(2R+3G+2B)/2 \text{ (light-dark opponent system)};$$

$$T=R-G \text{ (red-green opponent system)};$$

$$D=(R+G-2B)/2 \text{ (yellow-blue opponent system)};$$

$$t=T/V;$$

$$d=D/V.$$

The values of variables t and d are normalized chromaticity coordinates characterized by a given proportion of R, G, and B, and represent the direction cosines of a vector in V-T-D space. It is sometimes convenient to convert t and d to a pair of values r and θ representing chroma (saturation) and hue where:

$$r=(t^2+v^2)^{1/2}; \text{ and}$$

$$\theta=\tan^{-1}(t/d).$$

In this representation, a given hue is sometimes said to be characterized by a given hue angle.

The VTD space approximates Guth's ATD opponent vision model, but uses a different luminance correlate, namely V. It has been found that using V to normalize the chromaticity coordinates provides a chromaticity space that is more uniform in differences in perceived chroma than would be achieved by using A. Using A, on the other hand, provides a space that is more uniform in differences in perceived brightness. The value of a color's V coordinate is sometimes referred to as the V value or the lightness of the color.

The computations of A, T, and V can be accomplished by logical shifts and additions. In a specific embodiment, computations are performed with 32-bit integers, and shifts are performed last to preserve precision. It is noted that V has a value in the range 0–892.5 (R, G, and B all 0 or all 255). Each of T and D has a value in the range –255 to 255.

Figure 4:
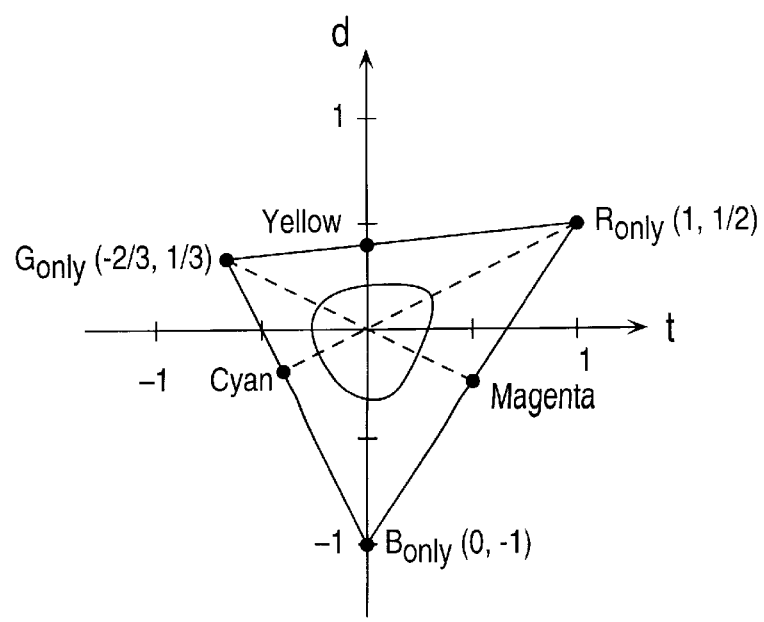
FIG. 4 is a plot showing the meta RGB primaries in the t-d plane.

FIG. 4 is a plot showing the meta RGB primaries in the t-d plane. If a color has only an R component, t=1 and d=½. Similarly, if a color has only a G component, t=–⅔ and d=⅓, while if a color has only a B component, t=0 and d=–1. A triangle joining these points encloses all the possible colors rendered by known colorants since the meta RGB primaries are on or outside the CIE (x, y) chromaticity boundary. Intermediate points on the sides of the triangle opposite the R, G, and B vertices correspond to cyan, magenta, and yellow. A curved contour within the triangle represents schematically the possible range of colors rendered by a given set of colorants used in a given target output device.

Target Printer Characteristics

A major aspect of the present invention is the faithful rendering of specified colors on a target output device. As mentioned above, the specific target printer has primary colorants consisting of cyan, magenta, and yellow inks, along with a mechanism for providing desired amounts of a neutral component.

Since, as alluded to above, a typical printer is not capable of rendering every color, the problem is twofold. First is how to render specified colors within the printer's gamut (capability) and second is how to simulate to the viewer colors outside of the printer's gamut. The subject of gamut mapping will be dealt with in depth in a later section. This section deals with characterizing the printer capabilities.

Figure 5:
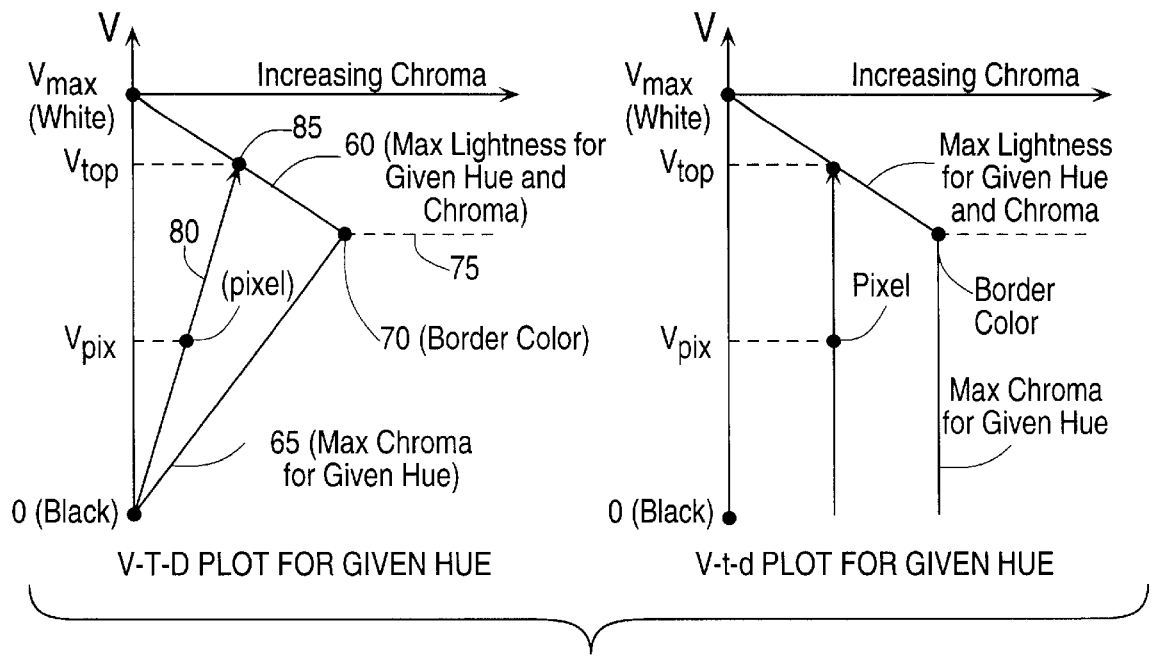
FIG. 5 includes a schematic V-T-D plot (lefthand portion) and a schematic V-t-d plot (righthand portion) for a given target printer for a given hue.

FIG. 5 includes a schematic V-T-D plot (lefthand portion) and a V-T-D plot (righthand portion) for a given target printer for a given hue. That is, the plots are taken in a given hue plane passing through the V axis (sometimes referred to as the neutral axis). Both plots show the V axis having an absolute black point for V=0 and a white point for V=$V_{max}$ (892.5 in the specific embodiment). A vector extending horizontally from the white point shows the direction of increasing chroma for the given hue. In each of the plots, only points on the right side of the V axis are discussed. The points on the other side of the axis in the same plane would have the opposite hue. The initial discussion below will be with reference to the V-T-D plot.

A line 60, sloping downwardly away from the white point in a direction of increasing chroma, represents the lightest colors (maximum value of V) that the target printer is capable of rendering for the given values of chroma. This line is sometimes referred to as the maximum lightness line. For simplicity, line 60 is shown as straight. The maximum lightness line necessarily extends downwardly since a given color is rendered by placing ink on the substrate, thereby reducing the amount of reflected light. The surface defined by this line and corresponding lines in other hue planes about the V axis is referred to as the umbrella surface, and colors on the umbrella surface are referred to as umbrella colors or surface colors. An umbrella color is, by definition, devoid of a neutral component, and thus is rendered by a single primary colorant or a combination of a pair of adjacent primary colorants. This would be the case even for embodiments where there were more than three primary colorants (e.g., CMY plus green and orange).

A line 65 sloping upwardly and away from the black point represents the colors of maximum chroma that the target printer can render for the given values of V. Line 65, referred to as the maximum chroma line, intersects maximum lightness line 60 at a color 70, referred to as the border color, where one or both of the primary colorants for the given hue is at maximum coverage. A dashed line 75 is shown extending outwardly from the border color. The triangle defined by the maximum lightness line, the maximum chroma line, and the V axis defines the colors at the given hue that can be rendered by the target printer. This is an oversimplification since, as will be described below, the target printer is typically unable to render a totally black area (V=0).

The figure shows the position in this hue plane of a measured pixel with a lightness value of $V=V_{pix}$ and a chroma less than the maximum chroma at the given lightness. A line 80 drawn through the black point and the pixel position intersects maximum lightness line 60 at a point 85 that is characterized by a lightness value designated $V_{top}$. It is noted parenthetically that line 80 is characterized by direction cosines equal to the t and d values for the pixel.

The plot in v-t-d space (righthand portion of FIG. 5) contains much the same information as the plot in V-T-D space, but the line of maximum chroma is generally parallel to the V axis. All points having a given chroma (r) lie at the same distance from the V axis. It is noted that t and d are not defined for V=0, but since the target printer cannot render absolute black, the line of maximum chroma for the target printer would not extend down to V=0.

Figure 6:
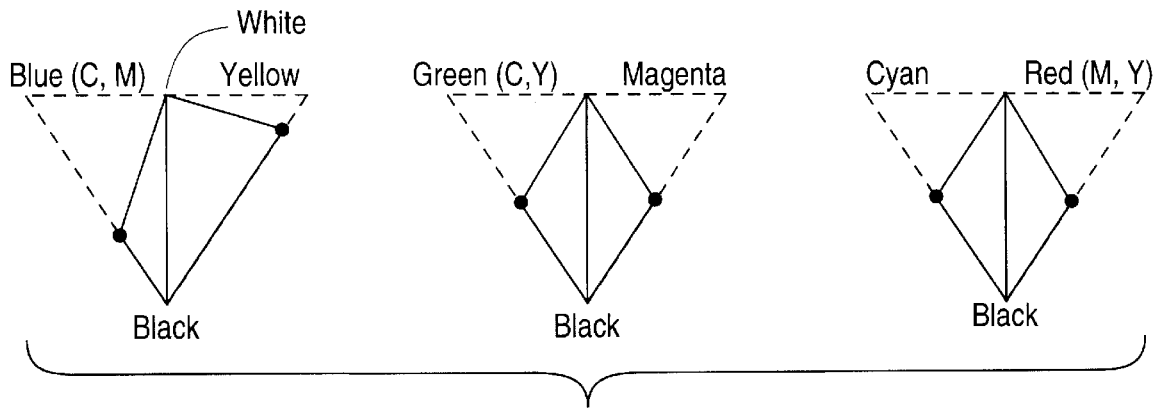
FIG. 6 includes three schematic V-T-D plots for the blue-yellow, the green-magenta, and the red-cyan hue planes.

FIG. 6 includes three schematic V-T-D plots for three particular hue planes. Each plot shows the maximum chroma and maximum lightness lines for the two hues on either side of the V axis. In particular, the lefthand portion of the figure shows the blue-yellow plane, the center portion shows the green-magenta plane, and the righthand portion shows the red-cyan plane. Note that blue at maximum chroma has a low lightness value since blue is achieved by overprinting the two darker primaries, magenta and cyan. Yellow at maximum chroma has a high lightness value since the yellow ink absorbs the least light.

Rendering a Color

Figure 7:
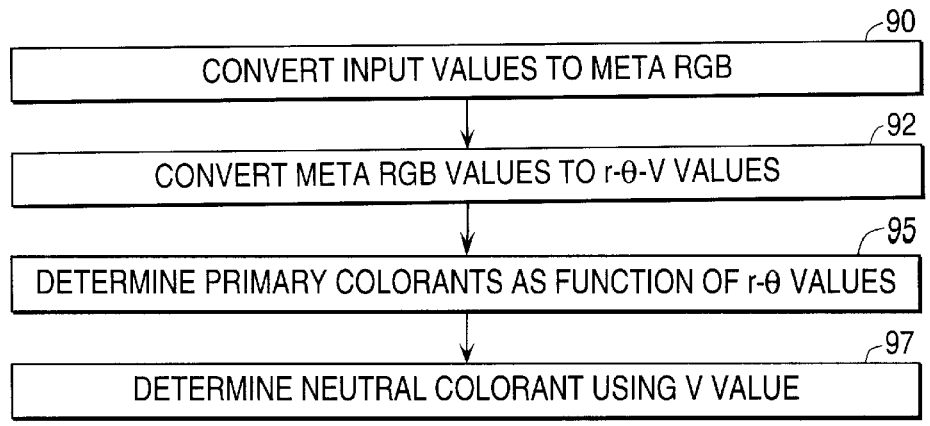
FIG. 7 is a high-level flowchart of a basic technique for rendering a color according to the present invention.

FIG. 7 is a high-level flowchart of a specific technique according to the invention for rendering a specified color on the target printer. While the description will be in terms of rendering a single pixel, the method will typically be carried out for all the pixels in an image. Such an image may contain 300–1200 pixels/inch and have an area on the order of 80 square inches. This means that the image may contain on the order of 100 million pixels. While images are typically repetitive, it is clear that the computations will have to be repeated many times. One aspect of the invention is that the computations are efficient.

The input pixel is first converted into a set of meta RGB values (step 90) and those values converted to chromaticity coordinates (step 92). The preferred chromaticity space is the V-t-d space or, equivalently, the V-r-θ space in which the pixel color is characterized by a lightness value $V_{pix}$ and chromaticity values $r_{pix}$ and $\theta_{pix}$. If the input pixel is already in meta RGB or V-r-θ coordinates, one or both of the above steps will be omitted. The next step is to determine a set of parameters, including primary colorant values, as a function of the chromaticity values $r_{pix}$ and $\theta_{pix}$ (step 95). The pixel's lightness value, $V_{pix}$, is normally not used in this determination (an exception is gamut mapping, to be discussed in a later section).

In the preferred embodiment, this function is implemented by providing a table, indexed by r and θ, characterizing the colors on the umbrella surface. The technique for creating this table will be discussed in a later section. In a specific embodiment, the table includes 256×512 entries, namely an entry for each possible 8-bit value of $r_{pix}$ and each possible 9-bit value of $\theta_{pix}$. Each entry includes a pair of primary colorant values required to render the umbrella color having those r and θ coordinates, and the lightness value, $V_{top}$, for that umbrella color. In a specific embodiment, a table entry is made more compact by storing an index specifying the particular pair of primaries whose values are being stored. This obviates the need to store 0's for the colorant values of primaries that are not present in the particular umbrella color. Also, entries for a given hue a having a chroma r that exceeds the chroma of the border color store the colorant values and $V_{top}$ value for the border color. In terms of FIG. 5, the table contains entries for points along dashed line 75, each storing the same set of parameters as are stored for point 70.

Once the colorant values and $V_{top}$ for the pixel are determined, the neutral component is determined (step 97). This determination is on the basis of the pixel's lightness $V_{pix}$ and the value $V_{top}$ determined on the basis of the pixel's chromaticity values $r_{pix}$ and $\theta_{pix}$. In particular, it is useful to define a darkness value $D_{pix}=(1-(V_{pix}/V_{top}))$, which is 1 for absolute black and 0 for white. This darkness value is the dot fraction for black. The colorant values and the darkness value for the pixel are then stored for subsequent use when the image is to be printed on the target printer. It is preferred to store the colorant values in a form that requires the least computation when those values are converted to printer commands. Accordingly, they are preferably stored as dot percentages (integer from 0–100).

It is useful to refer back to FIG. 5 to understand the method described above. The figure shows projecting the pixel onto the umbrella surface (intersecting it at point 85) and then projecting horizontally to obtain $V_{top}$. This is just a graphical representation of determining $V_{top}$ by finding the point on the umbrella surface that corresponds to the pixel's chromaticity values.

The invention's technique for converting the input pixel value to values suitable for commanding a printer is more computationally efficient than prior art techniques. According to common practice, printer information is stored in three-dimensional tables, corresponding to input tristimulus values. Given that it is impractical to store a three-dimensional table containing information for every possible tristimulus value (say $256^3$ entries), a sparser table is used. It then becomes necessary to engage in computationally expensive three-dimensional interpolation.

The present invention, on the other hand, separates out the lightness/darkness portion of the problem, thereby allowing the use of a two-dimensional table, indexed only by the two chromaticity coordinates. It is then practical to store information for all possible points in the chromaticity space, avoiding the need for interpolation. Indeed, in the specific embodiment, the table granularity is chosen to match the expected precision of the input r and θ values (based on 8-bit values for the meta RGB values). If for some reason it is necessary to have a table that does not store values for every possible r-θ combination, the values can be determined by interpolation in the two-dimensional r-θ space, which is much faster than a three-dimensional interpolation.

Creating the Umbrella Table

In order to construct a table that provides colorant parameters for the target printer's umbrella surface, it is necessary to render a set of umbrella colors using the umbrella printer and make accurate measurements of them. The set of umbrella colors preferably satisfies the following conditions: each color in the set can be printed using the target printer; each color in the set is the lightest color that the target printer can render with the given chromaticity (i.e., hue and chroma); the set contains sufficiently many colors, distributed sufficiently well over the chromaticities the target printer can render, to allow accurate and precise color interpolations in the steps that follow; boundary colors are those for which at least one of the primaries has the greatest chroma that the target printer can render for that primary;

and the set contains sufficiently many boundary colors to allow accurate and precise interpolation of the most saturated colors the target printer can render in the steps that follow.

Figure 8:
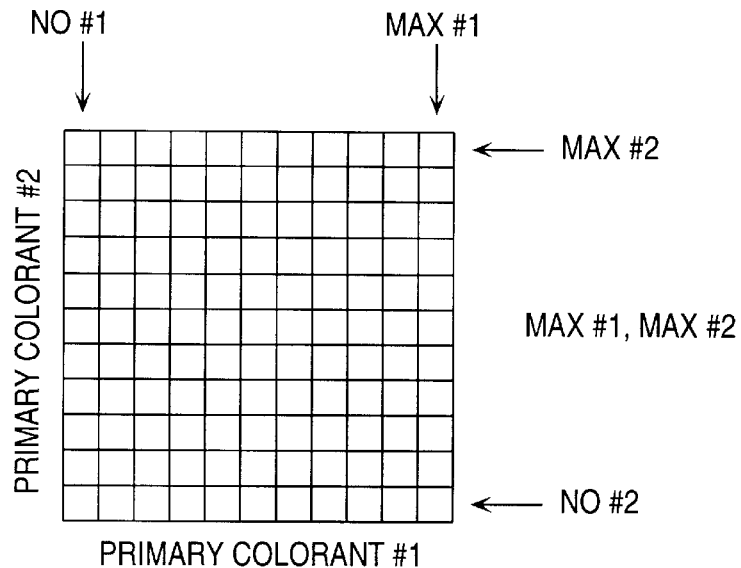
FIG. 8 is a schematic view of one of the umbrella charts used to generate the colorant map.

FIG. 8 is a schematic view of one of three umbrella charts used in creating the umbrella table. In a specific embodiment, each umbrella chart is a square piece of paper with a grid of colored patches on which adjacent pairs of primaries are combined in different combinations. The amount of a first primary colorant increases from 0% dot coverage to 100% rendered dot area along the horizontal direction while the amount of a second primary colorant increases from zero dot coverage to 100% rendered dot area along the vertical direction. Therefore, the lower left patch is white while the upper right patch contains 100% of both primaries. The patches along the right edge have the first primary at 100% while the patches along the upper edge have the second primary at 100%. Each of charts shares a side with each other chart. The boundary colors are those umbrella colors for which the rendered dot area of at least one of the C, M, and Y primaries is 100%.

There is no fixed rule as to how many samples are needed for a given pair of primary colorants. As illustrated, there are 11×11 samples, but as few as 4×4 or 8×8 could be sufficient. In an embodiment with 21×21 samples for each pair of primary colorants, all of the dot area percentages are from the set of values $\{0, 15, 27, 36, \ldots, 97, 99, 100\}$, which are the values obtained by applying the formula $1.43x/(0.43+x)$ to the set of values $\{0, 0.05, 0.1, 0.15, \ldots, 0.9, 0.95, 1\}$. These values provide relatively uniform perceptual differences in chroma between adjacent values.

The specific commands used to create the target printer's umbrella colors are derived from the above numbers by first determining the target printer's dot gain functions. In the specific implementation this is done by measuring the dot area produced by each single-primary target printer command and making the measured and requested dot areas correspond. Thereafter the inverses of these functions are applied to the dot areas that define the umbrella colors.

Figure 9:
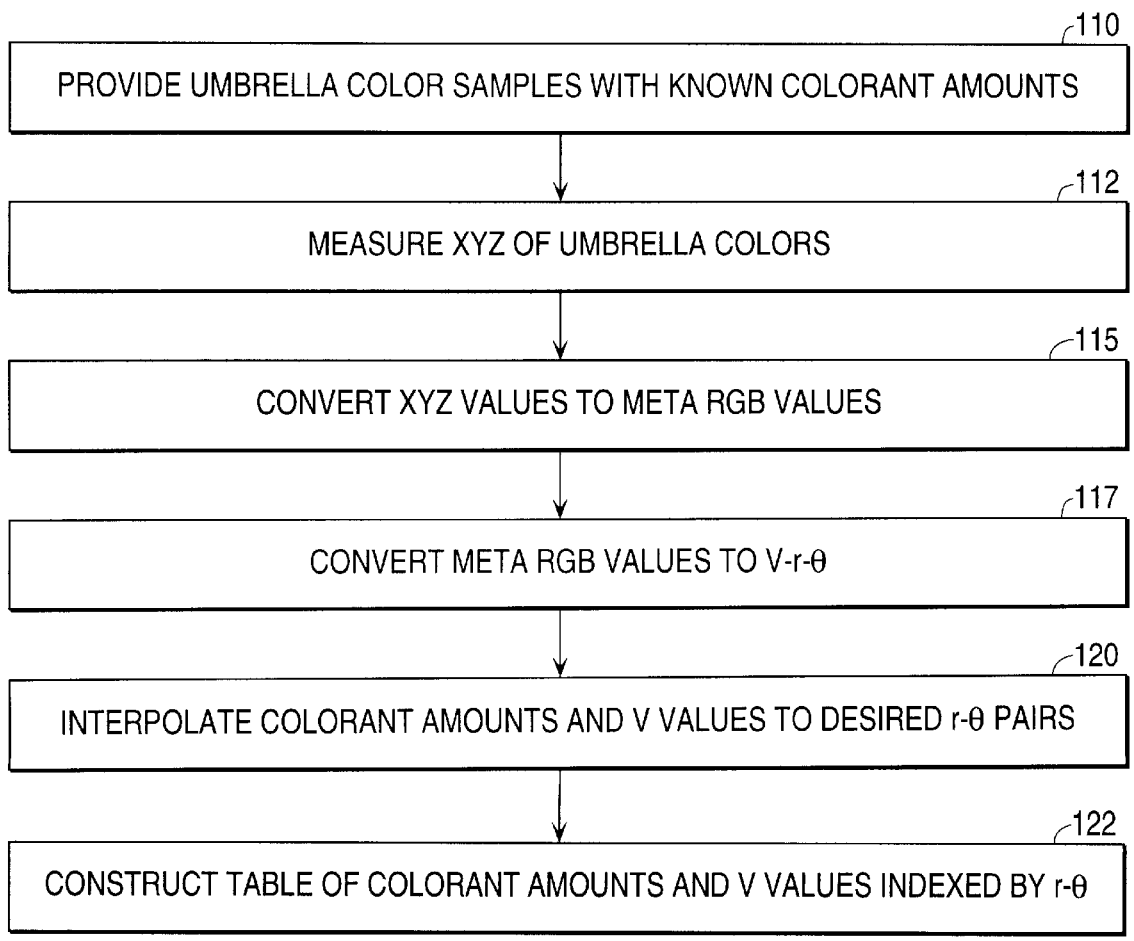
FIG. 9 is a flowchart of a method for generating a colorant map of chromaticity space.

FIG. 9 is a flowchart of a method for constructing the table of umbrella color parameters. First, the set of umbrella charts with known colorant information for each patch is provided as described above (step 110). Then, each umbrella chart patch is measured (step 112) with a calibrated device capable of providing reliable CIE XYZ values. This is important, since the validity of all the subsequently derived information will depend on the accuracy of the measured XYZ values. The XYZ values for each patch are then converted to meta RGB values (step 115) using the XYZ-to-RGB equations given above. The meta RGB values are then converted to V-r-θ values (step 117) using the RGB-to-Vrθ transformation given above. The result at this point is that each patch is characterized by its known colorant values and its measured Vrθ values. However, what is desired is the colorant values and the V value ($V_{top}$) for a different set of r-θ pairs, namely uniformly spaced increments of r and θ. This is achieved by interpolating in r-θ space (step 120). Then a table is constructed, indexed by r and θ, storing the interpolated colorant values and $V_{top}$ for each r-θ pair (step 122). The interpolation can be based on the nearest three points or the nearest four points in the chromaticity space. Currently interpolating based on the nearest four points is preferred. In a specific implementation, each table entry includes an 8-bit field for the index that specifies the particular primary colorant pair for the entry, two 8-bit fields for the primary colorant values, and a 16-bit field for $V_{top}$.

Gamut Mapping

As mentioned above, the gamut mapping or gamut compression problem arises when the target output device is incapable of rendering every color that is specified in the input image. The problem is similar to that of sweeping dirt under a rug. The lump in the rug (the mapping error) needs to be hidden in some dark corner out of sight, while presenting to the casual visitor the appearance of a properly cleaned house. As will be seen in connection with the discussion below, the invention seeks to preserve lightness (where possible) and hue, while reducing chroma if necessary to achieve excellent appearance.

Figure 10:
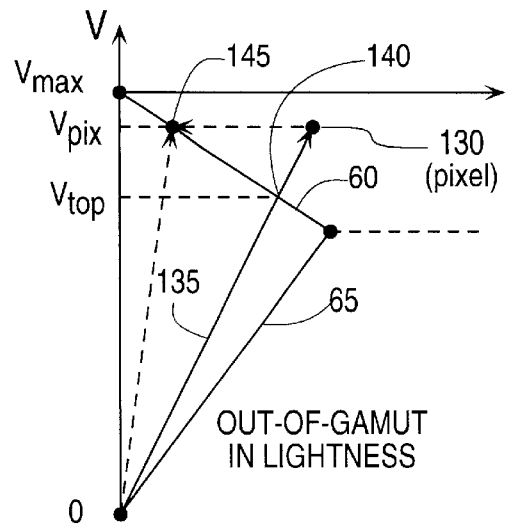
FIG. 10 is a V-T-D plot showing gamut mapping for an out-of-lightness situation.

FIG. 10 is a V-T-D plot showing gamut mapping for an out-of-lightness situation, i.e., a situation where the color to be rendered has a lightness (V value) that is too large for the printer to render at the pixel's chroma (r value). Put another way, the pixel designated 130 is above the umbrella surface (the projection in the plane being line 60), but within the maximum chroma limit (defined by maximum chroma line 65). This is shown schematically as the pixel defining a vector 135 that intersects line 60 at a point 140. This manifests itself in the pixel's specified $V_{pix}$ being greater than $V_{top}$ for the pixel's r and θ coordinates, i.e., $V_{top}$ for point 140.

This region is the most difficult to handle in that there is little that can be done to hide errors. The lightness boundary limit is produced by the inherent darkness of the printing inks. An ink that is colorful is by its very nature dark because it can only reflect light in a very narrow range of the spectrum. As mentioned above, normal CMYK printing has great darkness limits in the overprints (i.e., red, green, and blue). However new ink sets such as the Hi-Fi Color sets are removing some of this limitation by adding inks and therefore eliminating the dark overprinting.

The current strategy is to maintain the lightness of the pixel and to reduce the chroma. It has been found that maintaining the black content of an image is most important to achieving an appearance match to the original. This is shown schematically by mapping the pixel to a point 145 on the umbrella surface where $V_{pix}=V_{top}$. The original pixel is shown with a solid vector from the black point while the mapped pixel is shown with a dashed vector. This is implemented by accessing r-θ table entries for successively lower values of r until an entry is found for which the stored value of $V_{top}$ is equal to $V_{pix}$. The colorant values stored for this point are used, but there is no neutral component since the mapped point is on the umbrella surface. That is, while the darkness would be computed in the normal way, i.e., $D_{pix}=(1-(V_{pix}/V_{top}))$, the fact that $V_{pix}=V_{top}$ leads to $D_{pix}=0$.

While this mapping is crude compared to an approach where the gamut transitions in a smooth fashion, it has been found to produce very good results. This is because most dye sets suffer from the same problem and therefore the amount of desaturation of the output color required to obtain a luminance match with the original is normally small. This is not true for computer generated input images where the specified values are not limited by the printer and inks used to create the input image.

Figure 11:
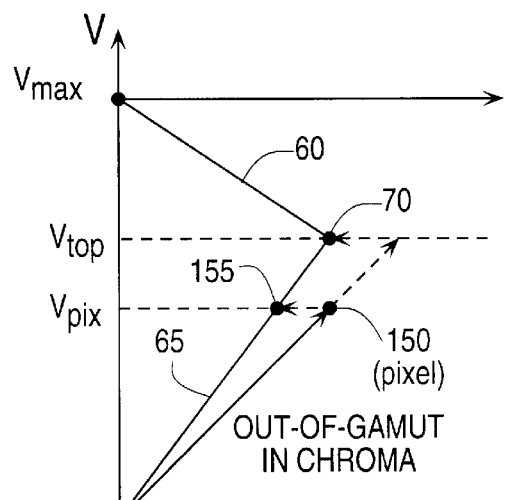
FIG. 11 is a V-T-D plot showing gamut mapping for an out-of-chroma situation.

FIG. 11 is a V-T-D plot showing gamut mapping for an out-of-chroma situation, i.e., a situation where the color to be rendered for a pixel 150 has a chroma (r value) that is too large for the printer to render at the pixel's lightness (V value). Put another way, the pixel is outside the maximum chroma limit, but still below the umbrella surface (as extended downwardly past the border point).

Again, the approach is to maintain the lightness while reducing the chroma. This is shown schematically by mapping the pixel to a point 155 on maximum chroma line 65 with the same V value, $V_{pix}$. This is implemented automatically since, as mentioned above, the entries in the r-θ table for r values beyond r for the border color are equal to the entry for the border color. Thus a pixel whose r value is beyond the chroma limit is mapped to the chroma limit, and the colorant amounts and value of $V_{top}$ for border color 70 are used. The darkness for the pixel is computed in the normal way, namely $D_{pix}=(1-(V_{pix}/V_{top}))$ where $V_{top}$ is determined for the border color.

Figure 12:
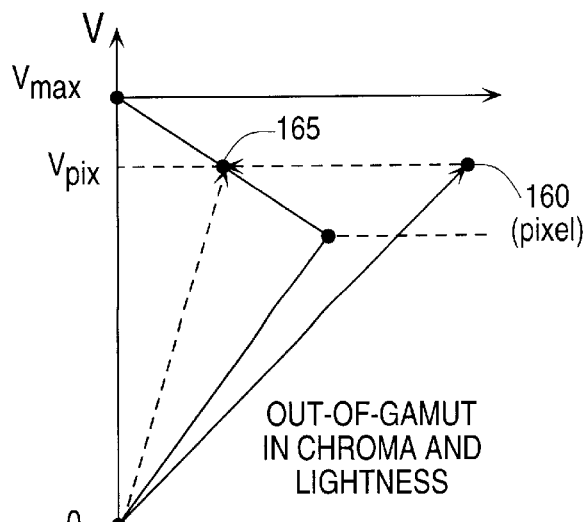
FIG. 12 is a V-T-D plot showing gamut mapping for an out-of-chroma and out-of-lightness situation.

FIG. 12 is a V-T-D plot showing gamut mapping for a pixel 160 presenting an out-of-chroma and out-of-lightness situation. This situation is handled in the same manner as the out-of-lightness but within chroma situation discussed above. Pixel 160 is mapped to a point on the umbrella surface that has the same lightness. Again, the darkness is 0.

Figure 13:
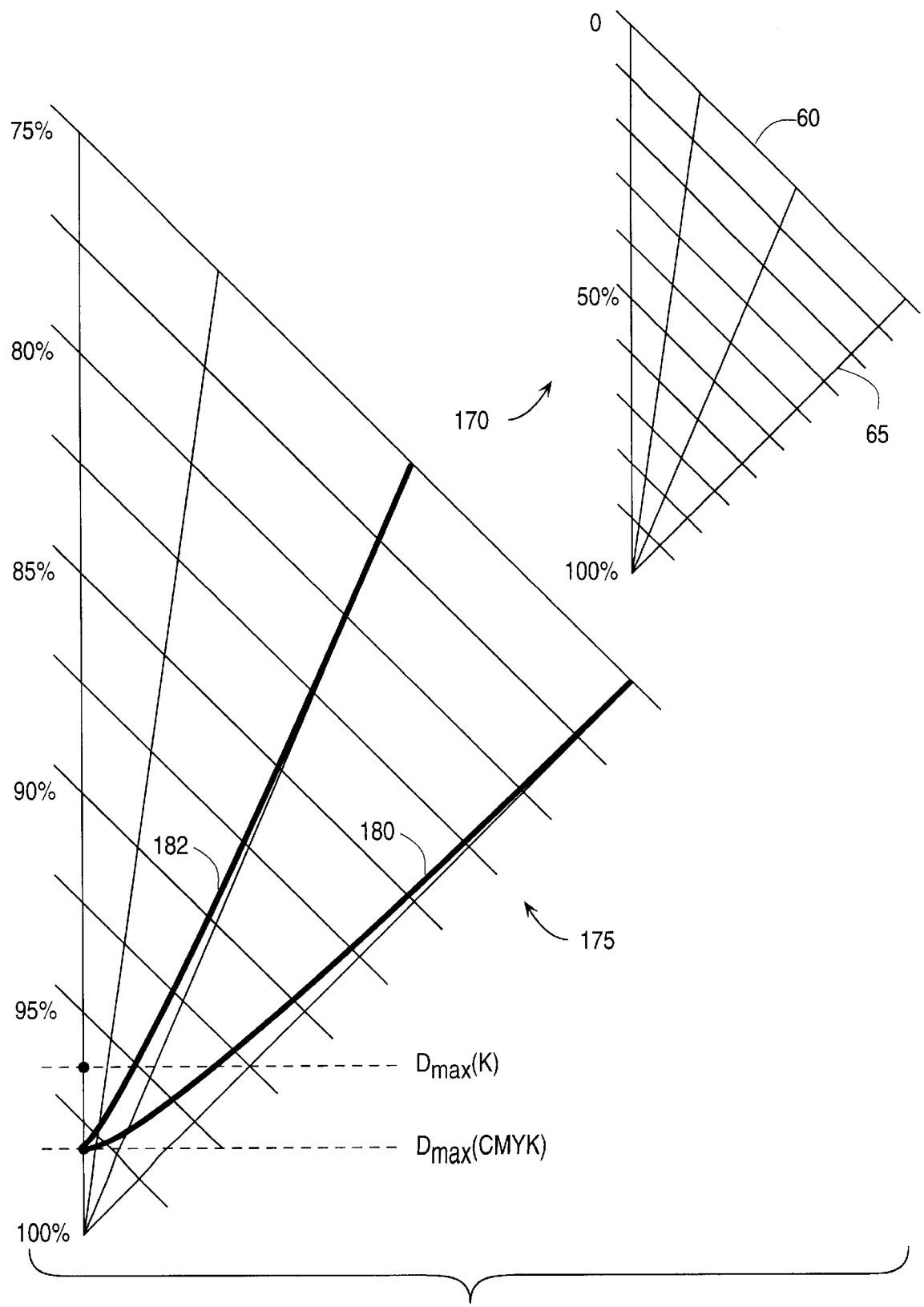
FIG. 13 includes V-T-D full-range and detail plots showing gamut mapping for an out-of-darkness situation.

FIG. 13 shows a V-T-D plot 170 for a given hue plane, and an enlarged detailed view 175. As in the V-T-D plot shown in FIG. 5, the plot includes maximum lightness (umbrella) line 60 and maximum chroma line 65. This plot differs from the V-T-D plot shown in FIG. 5 in that the vertical (neutral) axis is labelled in terms of darkness. As discussed above, the darkness $D_{pix}$ of a pixel is related to the pixel's lightness value by the equation $D_{pix}=(1-(V_{pix}/V_{top}))$. The darkness here is expressed in percent, with 0 being the lightest and 100% corresponding to the absolute black point. The plot also has a number of lines parallel to the maximum lightness line. These lines are lines of constant darkness for different chroma values. All values on the umbrella surface have 0 darkness since $V_{pix}=V_{top}$. Shown in the full range plot are lines spaced at 10% intervals. The detail plot, which only includes darkness values greater than 75%, has lines spaced at 2.5% intervals.

It is also common to refer to darkness in terms of reflectivity, R, which has a maximum theoretical range from 0-100%. As a practical matter, the best black ink has a reflectivity on the order of 2%. It is also common to refer to darkness in terms of density, which is defined in terms of R as $-\log_{10}R$, which would be 0 for a totally reflective surface and infinite for a totally absorbing surface. All surfaces have some reflectivity. For a reflectivity of 2%, the density is about 1.7. To print a darker color, it is typically necessary to print a neutral mixture of colorants in addition to the black. The darkest color practically obtainable has a density of about 2.3, which corresponds to a reflectivity of about 0.5%. Shown on the detail plot are two points on the neutral axis, at darkness values $D_{max}(K)$ and $D_{max}(CMYK)$, corresponding to the darkest value achievable with black ink only, and the darkest value achievable with black and a neutral combination of colorants.

The invention provides proper appearance of colors in the very dark regions of the output image by imposing a smooth transition to the $D_{max}(CMYK)$ point. That is, a color must decrease its chroma as it gets darker. The figure shows a portion of a curve 180, drawn as a heavy line, that extends downwardly along the maximum chroma line, but starts diverging toward the neutral axis at a threshold darkness value $D_{thresh}$, which in this example is on the order of 78%. For darkness values greater than this threshold, the chroma is linearly decreased for a smooth transition to the $D_{max}$(CMYK) point. A similar curve 182 is drawn along and then diverging from a line of lower chroma. These curved trajectories illustrate how the constant chroma lines are mapped to the gamut scaled black point of the target printer.

As mentioned above, achieving the maximum darkness typically entails printing with black ink and a neutral combination of primary colorants. As the required amount of the neutral combination increases as the required darkness increases, it is necessary to reduce the chroma, i.e., the colorant values, to make room, in effect, for the colorants in the neutral combination. Put another way, in the darkest portions of the image, both the luminance and chromaticity components of the image must be dealt with.

The target printer is in part characterized by the umbrella table, which stores primary colorant values for rendering the chromatic component of the color, and $V_{top}$, which allows a calculation of darkness. The target printer is also characterized by a set of tables, indexed by specified darkness, which provide information for adding darkness to the rendered color. The darkness tables implement a desired back model, i.e., a desired mapping of printed darkness to specified darkness. The darkness information includes, for each value of specified darkness, the colorant values for rendering the neutral component for that darkness, and further includes a chroma reduction factor for that darkness. Conceptually these are two types of information, used at different times in the process, as will be discussed below. It is a matter of design choice whether there are separate tables for the chroma reduction factor and the colorant values, or whether all the information is stored as a compound entry in a single table. In the discussion that follows, reference will normally be made to the darkness table, it being understood that there may be more than one table. Since the darkness table is indexed by a single value, it can contain entries for many possible values so that the values can be obtained directly. If interpolation is needed, it is only one-dimensional interpolation, and therefore fast.

Figure 14:
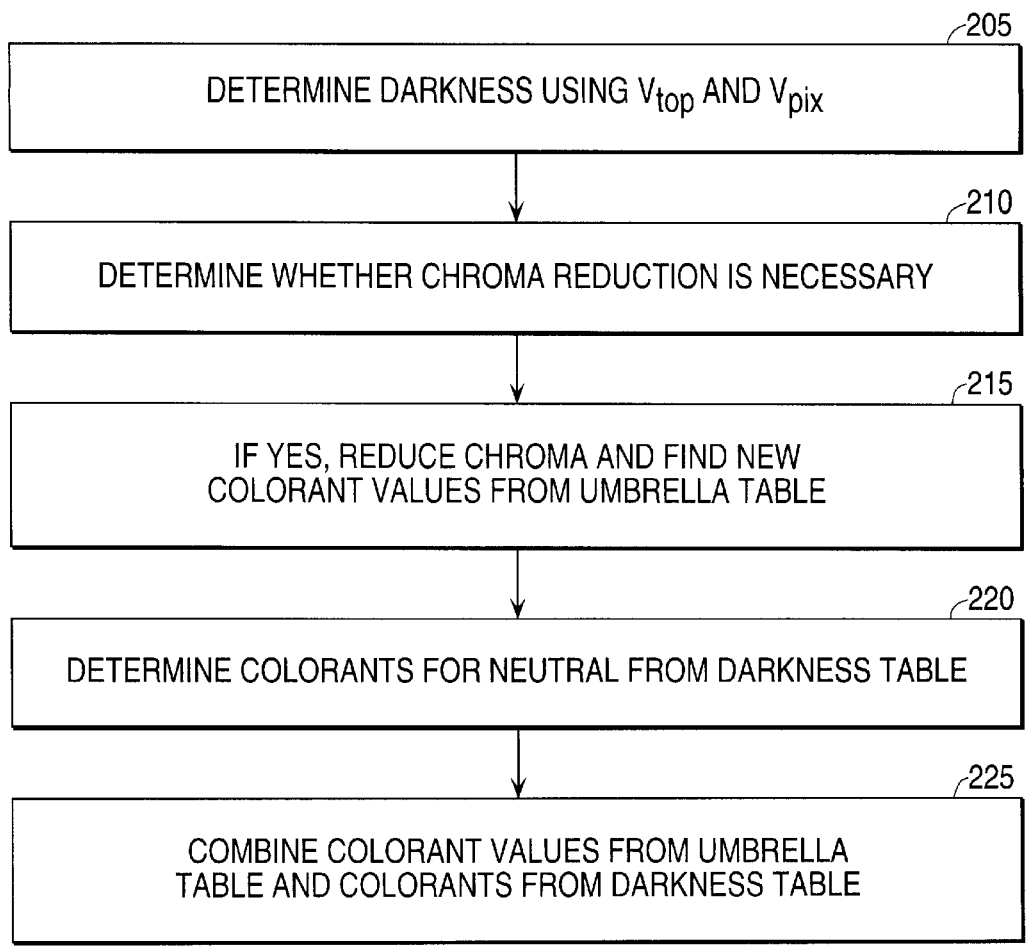
FIG. 14 is a flowchart of a specific technique for determining the colorant values for a specified color.

FIG. 14 is a flowchart of a specific technique according to the invention for determining the colorant values for rendering a specified color on the target printer. This flowchart represents an expansion of the last step in FIG. 7. It is assumed for this discussion that the color is specified in V-r-θ coordinates and that the input pixel's r-θ values have been used to determine the primary colorant values and $V_{top}$ from the umbrella table. As discussed above, this may be a direct lookup or may entail retrieving a number of entries from the table and deriving the information by interpolation.

The darkness value is determined (step 205) from the equation $D_{pix}=(1-(V_{pix}/V_{top}))$, and a chroma reduction factor is determined from the darkness table (step 210). Although the chroma reduction is only used for darkness values above $D_{thres}$, it may be convenient to store a value signifying that no chroma reduction is necessary, and test the reduction factor returned from the table. This avoids the need for the main routines to deal directly with the value of the darkness threshold, which may be different for different target printers. If the value from the chroma reduction table specifies a reduction in chroma, the new value of r is used with the original value of θ to obtain new colorant values from the umbrella table (step 215).

The darkness value $D_{pix}$ is not changed, however, and is then used to obtain colorant values from the darkness table (step 220). In the specific example, the darkness table provides amounts of C, M, Y, and K, with the C, M, and Y values being 0 for darkness values below $D_{thres}$. The colorant values from the umbrella table and the colorant values from the darkness table are added together (step 225) to provide the final colorant values for printing. In this particular black model, darkness is provided by black ink alone for most of the image. This has the advantage of using less colored ink than in black models where colored inks are used for all values of darkness.

Creating the Darkness Table

Figure 15:
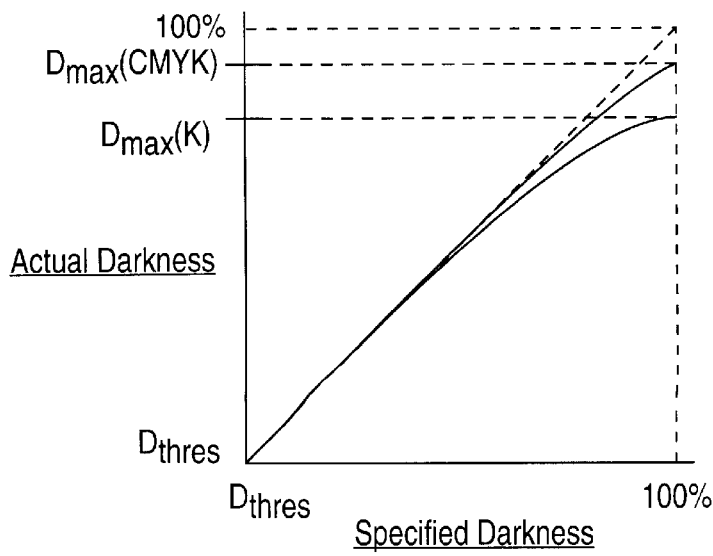
FIG. 15 is a plot of actual darkness as a desired function of specified darkness.

FIG. 15 is a plot of actual darkness as a desired function of specified darkness, thus showing a desired compression profile for the target printer in the region above $D_{thres}$. The darkness table is based on a characterization of the target printer's capability, which is in part described by the maximum darkness values $D_{max}(K)$ and $D_{max}(CMYK)$. In order to provide a smooth transition, the actual darkness is caused to equal the specified darkness in the range (not shown in the plot) of $O$-$D_{thres}$, and to roll off smoothly with a smooth (parabolic) departure from linearity to assume a value equal to the maximum printable darkness when the specified darkness is 100%. The difference between the specified darkness and the actual darkness at any given specified darkness value in the range of $D_{thres}$–100% is the compression at that value of specified darkness. The relative compression for a given darkness is the ratio of the compression at that darkness to the compression at 100%. Thus the relative compression is 0 at $D_{thres}$ and 1 at 100%. The chroma reduction ratio is just the relative compression.

Figure 16:
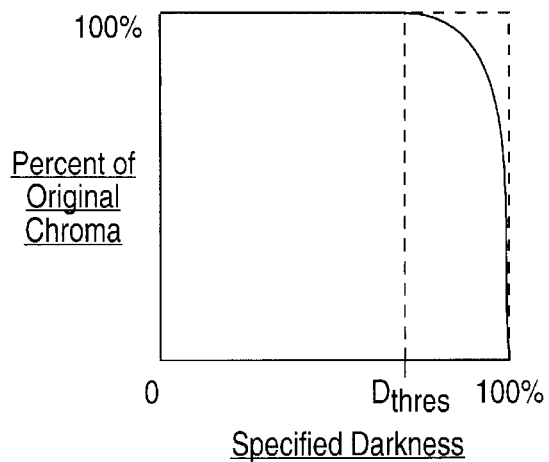
FIG. 16 is a schematic plot of the proportion of original chroma that is allowed to remain as a function of specified darkness.

FIG. 16 is a schematic plot of the proportion of original chroma that is allowed to remain as a function of specified darkness, i.e., 1 minus the chroma reduction ratio. This mapping maximizes chroma value in the image while accommodating the need for a smooth compression function. For the same point in the t-d chromaticity diagram the chroma differences will decrease as a function of darkness. It is this difference in perception that is maintained by this mapping.

Figure 17:
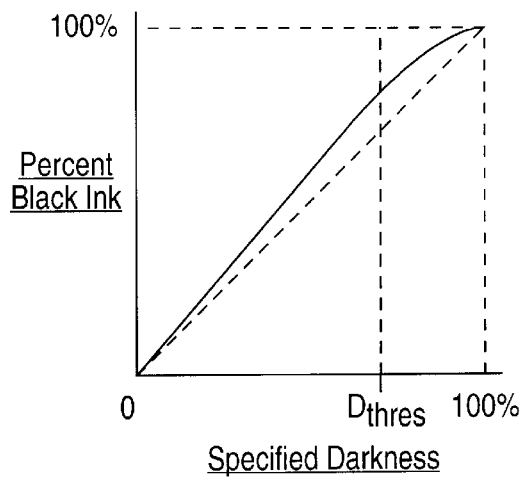
FIG. 17 shows schematically the amount of black ink as a function of darkness.

FIG. 17 shows schematically the amount of black ink as a function of darkness. Since the black ink at 100% coverage has some reflectivity, the desired profile is obtained by having the ink value rise linearly with a slope greater than 1 for specified darknesses in the range of $O$-$D_{thres}$ and gradually fall off to reach 100% ink for 100% darkness. As an example, a 75% dot area gives about 72% darkness on smooth paper and about 68% darkness on newsprint.

Figure 18:
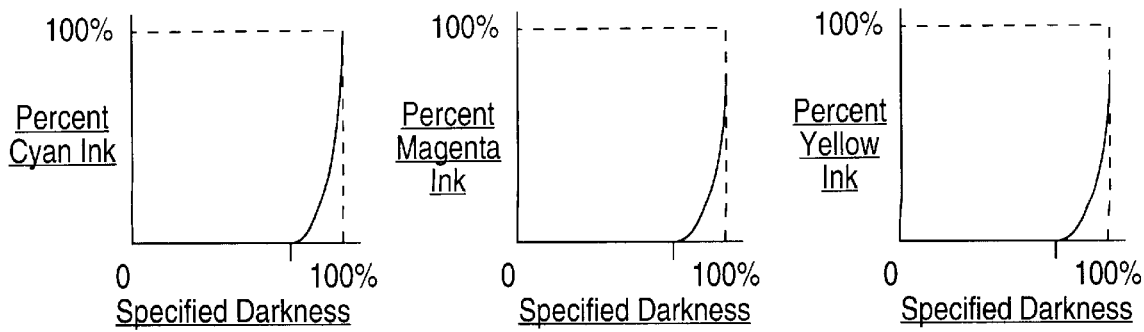
FIG. 18 shows schematically the amounts of C, M, and Y inks as a function of specified darkness.

FIG. 18 shows schematically the amounts of C, M, and Y inks as a function of specified darkness. These inks are in the approximate ratio of 5:4:4 to provide a neutral hue (approximately 100%, 80%, and 80% for 100% darkness). These CMYK colorant values are determined empirically. First, a neutral CMY black is found by printing various values of C and adjusting Y and M in the neighborhood of 80% of the C value and selecting the values that give the best result at the different darkness values. Then an overprint grid is printed with different darkness values for the K black and the CMY black. Combinations for the K black at darkness values in the range $D_{thres}$–100% and CMY black in the range 0–100% (dot percentage for the cyan). These may be at 1% darkness or dot area increments for K black and 10% increments for CMY black. The combined darknesses are measured and a locus of smoothly increasing darkness values is found.

Gamut Mapping for Proofing

In the context of proofing, a typical gamut mapping problem is that of compressing the gamut of a final output (high-end) printer to that of a proofing (low-end) printer having a smaller gamut. In some of the discussion that follows, reference will be made to the original dye set and the reproducing dye set. The original dye set typically refers to the dyes for the high-end printer. The reproducing dye set refers to the dyes for target or proofing printer. Again, this is a special case since the target output device can be a monitor or the like. The present invention maps as much of the image to preserve the appearance of the original. The invention seeks to distort pixel values only in regions where the eye compresses the response to the input stimulus. The greater the visual system's compression, the greater is the ability to hide error.

A simple first case is one in which the gamut of the target output device is much larger than that of the original image. In this situation, it is clear that if the copy image has replicated the original, pixel for pixel, an observer or a calorimeter would not see a difference between the pixels. This example does not require a color model or some nonlinear transform to produce the copy. Such transforms would add nothing to this process and in some cases might cause loss of some image detail in the level quantization.

In a second case, the gamut of the target device is smaller than that of the original. The present invention provides a compromise solution to the mapping problem that smoothly interpolates between the first case one and the second without requiring gamut clipping or simple scale compression. The invention has the property of keeping most of the pixels the same as in the original, thus preserving the appearance of the original.

Figure 19:
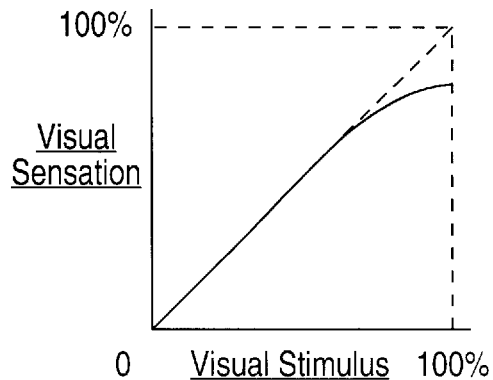
FIG. 19 is a plot of a visual sensation as a function of a visual stimulus.

FIG. 19 is a plot of a visual sensation as a function of a visual stimulus. The figure compares a non-compressive system (as denoted by the straight line) to the compression explained by Guth's model of the human visual system. As can be seen in the figure, the curve depicting the actions of the human visual system pulls away from a strict linear relation. The distance between the curves is proportional to the ability to hide gamut errors. The equation for the behavior of the visual system can be expanded in a Taylor series as follows:

$$V(S) = (K_1/K_2)*S - (K_1/K_2^2)*S^2 + \text{higher order terms}$$

The series expansion shows that the compression function deviates in a parabolic fashion from the physical stimulus to the visual sensation. The second order term is the compression cost factor that determines how much error can be distributed in a given region of the visual sensation. The present invention exploits this aspect of the human visual system by preadapting values using this type of response curve rather than using a uniform proportional reduction or clip.

Figure 20:
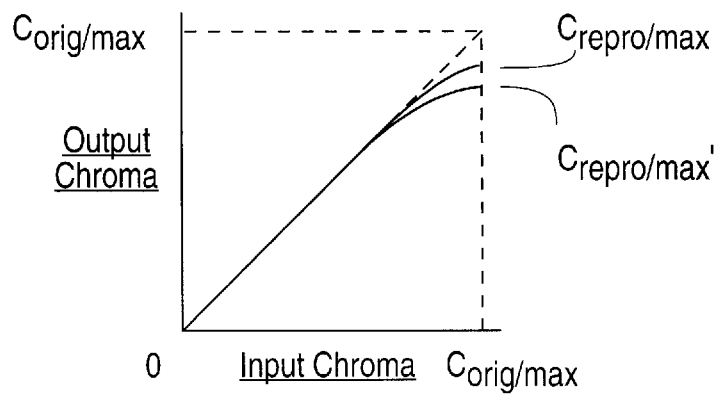
FIG. 20 is a plot of prescribed output chroma as a function of input chroma.

FIG. 20 is a plot of prescribed output chroma as a function of input chroma, which illustrates the use of the cost function. For a given hue angle the chroma limit of the original dye set is $C_{orig/max}$. The figure shows the adaptation curves for two different reproducing dye sets. One has a chroma limit $C_{repro/max}$ only slightly less than that of the original dye set, while the second has a chroma limit $C_{repro/max}$, that is on the order of $\frac{3}{4}$ of $C_{orig/max}$. In one possible embodiment, input chroma values are mapped according to the appropriate curve. The illustrated curves take account of the human visual response, which tends, to some extent, to respond less to chroma differences at high values of chroma. By mapping to the input values for chroma values up to about 70–80% of the maximum input, chroma is preserved in the regions that the visual system would be most sensitive to deviations. Put another way, the cost function maintains the original image levels and allows deviation to occur only in the regions where the visual system would be compressing the input. This form of compression maintains the image appearance by remapping the original compression function to one that is near.

This form of mapping tends to preserve the psychological relation between scene elements. Therefore, almost all aspects of the original adaptation fields are preserved because this is simulating a system that has nearly the same compression function as the original. Under this condition, all the spatial aspects of color vision also would be preserved because the signals seen by the eye have changed little from the original. This is a much different strategy than that used by first converting the image using the CIE Lab or CIE Luv transformations and then gamut compressing in the nonlinear space provided by those transformations.

Darkness compression can be treated using the same strategy as described above for the chromatic channel. In this case the mapping errors are hidden in the dark portions of the image. The task at hand is to map the darkness range of the original to the darkness range of the reproducing system.

Figure 21:
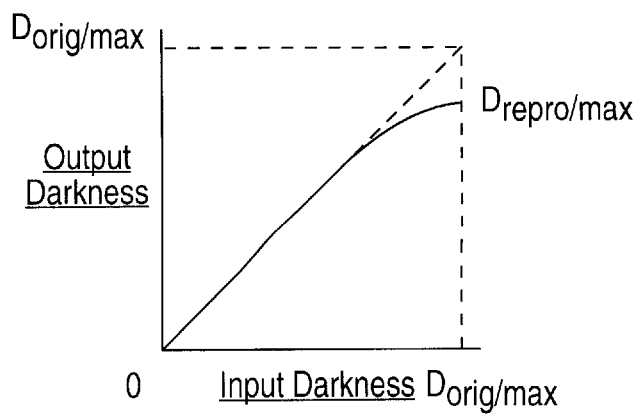
FIG. 21 is a plot of prescribed output darkness as a function of input darkness.

FIG. 21 is a plot of prescribed output darkness as a function of input darkness, illustrating the mapping process. The parabolic scaling method is used to map the darkness limit of the original dye set, $D_{orig/max}$, to the darkness limit of the reproducing dye set, $D_{repro/max}$. The darkness resealing maintains the relationship in the lightest areas of the image and hides the mapping error in the deep shadows. The darkness concept used to map gray scale minimizes the degree of mapping error relative to the perception of lightness over the range of normal hard copy reproduction systems. This would cover the range from newsprint to high end printing on coated stock.

Conclusion

In conclusion, it can be seen that the present invention provides elegant and powerful techniques for rendering specified colors. The determination of primary colorants in a two-dimensional chromaticity and the separate determination of the darkness component provide for significant improvements in computational efficiency. The smooth transition in reducing chroma in the dark regions of the image allows a uniform convergence to black without banding or other artifacts.

While the above is a complete description of specific embodiments of the invention, various modifications, alternative constructions, and equivalents may be used.

For example, while the description of the black model was in terms of a CMYK printer, the techniques would work for a CMY printer, or in the case of a CMYK printer whose black dye is not sufficiently neutral. In this case, the black model would be different since all the darkness would come from the combination of the primary colorants. In such a case, the chroma reduction would begin as soon as there was any darkness. Conversely, the black model could be built using more than one neutral colorant to provide a larger number of graduations and possibly richer blacks.

Furthermore, as mentioned above, while the particular chromaticity space described is preferred, other chromaticity spaces could be used and would tend to provide similar benefits. Moreover, while the invention is illustrated as being embodied in a general purpose computer, various of the computations could be performed by the dedicated processors in the input and output devices such as the scanner or the printer.

Therefore, the above description should not be taken as limiting the scope of the invention as defined by the claims.

What is claimed is:

1. A computer-implemented method of determining colorant values for rendering a color on a target printer wherein
the color is specified by a set of values that include a lightness value $LL_{col}$ that correlates with luminance and a pair of chromaticity values $c1_{col}$ and $c2_{col}$ in a two-dimensional space that spans hue and chroma, and
the target printer responds to commands specifying amounts of a set of colorants including at least two primary colorants,
the method comprising the steps of:
determining, as a first function of $c1_{col}$ and $c2_{col}$, (a) a first set of prescribed colorant values for printing a color characterized by the $c1_{col}$ and $c2_{col}$ pair at the maximum lightness that the target printer can print for $c1_{col}$ and $c2_{col}$, and (b) a representation of the maximum lightness, referred to as $LL_{top}$, for $c1_{col}$ and $c2_{col}$;
determining a darkness value $D_{col}$ of the color on the basis of $LL_{col}$ and the representation of $LL_{top}$ for $c1_{col}$ and $c2_{col}$;
determining, as a second function of the darkness value, $D_{col}$, a second set of colorant values;
for at least some values of $D_{col}$, adjusting the first set of prescribed colorant values downwardly to define a color having the same hue as, but a lesser chroma than, the color characterized by $c1_{col}$ and $c2_{col}$; and
determining a third set of colorant values by combining the first and second sets of colorant values.

2. The method of claim 1 wherein:

the first function is implemented by providing a two-dimensional table, referred to as the umbrella table, characterizing the target printer, which table includes, for each particular one of a plurality of c1–c2 pairs, an entry including (a) a set of colorant values for printing a color characterized by the particular c1–c2 pair at the maximum lightness that the target printer can print for the particular c1–c2 pair, and (b) a representation of the maximum lightness, referred to as $LL_{top}$, for the particular c1–c2 pair; and said step of determining as a first function includes using the umbrella table to find (a) said first set of prescribed colorant values for printing a color characterized by $c1_{col}$ and $c2_{col}$ at the maximum lightness, and (b) said representation of $LL_{top}$ for $c1_{col}$ and $c2_{col}$;

the second function is implemented by providing a table, referred to as the darkness table, which table includes for each particular one of a plurality of specified darkness values, an entry including a set of colorant values for printing a neutral component having an actual darkness that bears a predetermined relationship to the particular specified darkness value; and said predetermined relationship is that the actual darkness is substantially equal to the specified darkness for darkness values up to a threshold darkness, and smoothly decreases from the specified darkness to a value equal to the maximum darkness that the target printer can print when the specified darkness is 100%.

3. A computer-implemented method of determining colorant values for rendering a color on a target printer wherein
the color is specified by a set of values that include a lightness value $LL_{col}$ that correlates with luminance and a pair of chromaticity values $c1_{col}$ and $c2_{col}$ in a two-dimensional space that spans hue and chroma, and
the target printer responds to commands specifying amounts of a set of colorants including at least two primary colorants,
the method comprising the steps of:
providing a two-dimensional table, referred to as the umbrella table, characterizing the target printer, which table includes, for each particular one of a plurality of c1–c2 pairs, an entry including (a) a set of colorant values for printing a color characterized by the particular c1–c2 pair at the maximum lightness that the target printer can print for the particular c1–c2 pair, and (b) a representation of the maximum lightness, referred to as $LL_{top}$, for the particular c1–c2 pair;

determining, on the basis of the umbrella table, (a) a first set of prescribed colorant values for printing a color characterized by $c1_{col}$ and $c2_{col}$ at the maximum lightness, and (b) a representation of $LL_{top}$ for $c1_{col}$ and $c2_{col}$;

providing a table, referred to as the darkness table, which table includes for each particular one of a plurality of darkness values, an entry including a set of colorant values for printing a neutral component having a darkness that bears a predetermined relationship to the particular darkness value;

determining a darkness value $D_{col}$ of the color on the basis of $LL_{col}$ and the representation of $LL_{top}$ for $c1_{col}$ and $c2_{col}$;

for at least some values of $D_{col}$, adjusting the first set of prescribed colorant values downwardly to define a color having the same hue as, but a lesser chroma than, the color characterized by $c1_{col}$ and $c2_{col}$;

determining a second set of colorant values from the darkness value $D_{col}$ and the darkness tables; and determining a third set of colorant values by combining the first and second sets of colorant values.

4. The method of claim 3 wherein:

the umbrella table includes entries for substantially fewer than all possible c1–c2 pairs; and said step of determining on the basis of the umbrella table includes extracting a number of entries from the umbrella table, and deriving the first set of prescribed colorant values and the representation of $LL_{top}$ for $c1_{col}$ and $c2_{col}$ by interpolation of values from the entries, so extracted.

5. The method of claim 3 wherein:

said step of adjusting the first set of colorant values comprises the steps of:

determining as a function of the darkness value $D_{col}$ a chroma reduction factor;

determining a pair of values $c1_{col}'$ and $c2_{col}'$ that define a color having the same hue as defined by $c1_{col}$, and $c2_{col}$ but a chroma reduced by the chroma reduction factor;

determining, on the basis of the umbrella table, a revised set of prescribed colorant values for printing a color characterized by $c1_{col}'$ and $c2_{col}'$ at the maximum lightness, the revised set of colorant values providing the downwardly adjusted prescribed colorant values;

said step of providing the umbrella table comprises the steps of:

printing a set of color samples with the target printer using known colorant values, the color of each sample being substantially devoid of a neutral component so as to provide the lightest color that the target printer is capable of printing at the given hue and chroma;

measuring each color sample to provide values of c1, c2, and lightness LL for that color sample; and associating with the measured c1 and c2 values for at least some of the color samples, the colorant values that produced that color sample, and the measured lightness value for that color sample;

R, G, and B are a set of tristimulus values related to CIE XYZ values by a predetermined linear transformation characterized by a non-singular 3×3 transformation matrix;

the pair of chromaticity values, denoted t and d, are related to the RGB values according to the equations $$t=2(R-G)/(2R+3G+2B) \text{ and}$$

$$d=(R+G-2B)/(2R+3G+2B);$$

the lightness value, designated V, is given by the equation $$V=(2R+3G+2B)/2;$$

the pair of chromaticity values are derived from t and d according to the equations $$r=(t^2+v^2)^{1/2}; \text{ and}$$

$$=\tan^{-1}(t/d);$$

the set of colorants includes exactly three primary colorants; and the primary colorants are C, M, and Y ink densities;

the set of color samples includes only colors rendered by single primary colorants and pairwise combinations of adjacent: primary colorants; and the set of color samples for a given adjacent pair of primary colorants includes:

a sample with a maximum density of one primary colorant with none of the other primary colorant;

a sample with a maximum density of the other primary colorant with none of the one primary colorant; and a sample with a maximum density of both primary colorants.

6. A computer implemented method of determining colorant values for rendering a color specified by a set of tristimulus values to an output device that responds to commands specifying at least two primary colorants and a form of neutral colorant, the method comprising the steps of:

mapping the tristimulus values to a set of values that include a lightness value LL that correlates with luminance and a pair of chromaticity values c1 and c2 in a two-dimensional space that spans hue and chroma;

deriving a set of parameters as a first function of the chromaticity values only, the set of parameters including primary colorant values, wherein the first function has the property that for at least some particular values of c1 and c2, the set of parameters have the same values as the set of parameters for different particular values of c1 and c2, where the different particular values of c1 and c2 define a color having the same hue and lightness as, but a lesser chroma than, the color characterized by the particular values os c1 and c2; and deriving the desired values of the neutral colorant as a second function of the set of parameters and the lightness value.

7. The method of claim 6 wherein:

the first function uses a table indexed by the pair of chromaticity values.

8. The method of claim 7 wherein:

c1 and c2 have n1 and n2 bits of precision, respectively;

the table contains $2^{(n1+n2)}$ entries corresponding to all possible combinations of values for c1 and c2; and the first function is implemented by a direct lookup in the table.

9. The method of claim 7 wherein:

c1 and c2 have n1 and n2 bits of precision, respectively;

the table contains substantially fewer than $2^{(n1+n2)}$ entries; and the first function is implemented by interpolating values extracted from the table.

10. The method of claim 6 wherein:

the set of parameters includes a set P of primary colorant values and a value $LL_{top}$ representing the lightness value of the color represented by P;

the second function depends only on the value of $LL_{top}$ and $LL_{col}$;

and further comprising the steps of:

further comparing $LL_{top}$ and $LL_{col}$;

if $LL_{col}$ is greater than $LL_{top}$, modifying c1 and c2 to maintain hue and reduce chroma so that when the first function is applied to the modified c1 and c2, the resultant, modified value of $LL_{top}$ is substantially equal to $LL_{col}$;

the set P of primary colorant values includes no more than two non-zero values;

the tristimulus values are related to CIE XYZ values by a predetermined linear transformation characterized by a non-singular 3×3 transformation matrix;

the set of tristimulus values are defined relative to a set of three primaries, designated the meta RGB primaries, that lie on or outside the normal CIE (x, y) chromaticity boundary;

the set of tristimulus values are a set of RGB values related to CIE XYZ values by a predetermined linear transformation characterized by a non-singular 3×3 transformation matrix;

the pair of chromaticity values, denoted t and d, are related to the RGB values according to the equations $t=2(R-G)/(2R+3G+2B)$ and $d=(R+G-2B)/(2R+3G+2B)$; and the lightness value, designated V, is given by the equation $V=(2R+3G+2B)/2$; and the pair of chromaticity values are derived from t and d according to the equations $r=(t^2+v^2)^{1/2}$; and $=\tan^{-1}(t/d)$.

11. A computer-implemented method for determining colorant values for rendering, on a target output device, colors specified by a pair of chromaticity values $c1_{col}$ and c2col in a two-dimensional space that spans hue and chroma, the method comprising:

accessing a data structure stored in a computer memory, said data structure including, for each particular one of a plurality of c1–c2 pairs, an entry including (a) a representation of a set of colorant values for rendering a color characterized by the particular c1–c2 pair at the maximum lightness that the target output device can render for the particular c1–c2 pair, and (b) a representation of the maximum lightness, referred to as $LL_{top}$, for the particular c1–c2 pair; and using data from the entry for the particular c1–c2 pair to determine colorant values to render the color on the target output device.

12. The method of claim 11 wherein said data structure is organized as at least one table indexed by the values of the c1–c2 pair.

13. The method of claim 11 wherein each entry includes:

colorant values for a pair of adjacent primary colorants of a plurality of at least three primary colorants; and only two colorant values; and an indicator of which pair of primary colorants.

14. A computer-implemented method for determining colorant values for darkening a rendered color on a target output device, the memory comprising:

accessing a data structure stored in a computer memory, said data structure including, for each particular one of a plurality of darkness values, an entry including (a) a representation of a set of colorant values for rendering a neutral component having a darkness that bears a predetermined relationship to the particular darkness value, and (b) a representation of a chroma reduction factor for the color to be rendered and using data from the entry for the particular darkness value to determine colorant values to darken the rendered color on the target output device.

15. A method of characterizing a target printer, the target printer being responsive to commands specifying values for at least one of a plurality of primary colorants, the method comprising the steps of:

printing a set of color samples with the target printer using known colorant values substantially devoid of a neutral component so as to provide the lightest color that the target printer is capable of printing at the given hue and chroma;

measuring at least some of the color samples to provide respective measurements of the form c1,c2,LL where LL is a lightness value that correlates with luminance and c1 and c2 are a pair of chromaticity values in a two-dimensional space that spans hue and chroma; and associating with the measured c1 and c2 values for at least some of the color samples, the colorant values that produced that color sample, and the measured lightness value for that color sample.

16. The method of claim 15, and further comprising the steps of:

constructing a table containing, for each of a set of evenly spaced values for c1 and c2, interpolated colorant commands and an interpolated lightness value derived from said associating step;

wherein:

the plurality of primary colorants includes exactly three primary colorants;

the primary colorants are C, M, and Y ink densities;

the set of color samples includes only colors rendered by single primary colorants and pairwise combinations of adjacent primary colorants;

the set of color samples for a given pair of primary colorants includes:

a sample with a maximum density of one primary colorant with none of the other primary colorant;

a sample with a maximum density of the other primary colorant with none of the one primary colorant; and a sample with a maximum density of both primary colorants;
said measuring step includes the substeps of steps of:
  defining an intermediate color space, referred to as the meta RGB space, having three meta RGB coordinates related to CIE XYZ coordinates by a linear transformation characterized by a non-singular 3×3 transformation matrix;
  providing a color measurement device capable of providing CIE XYZ values for a given measurement;
  measuring each color sample with the color measurement device;
  converting the measured CIE XYZ values for each color sample to meta RGB values; and
  converting the meta RGB values to c1,c2,LL values;
said step of defining the meta RGB space includes the substeps of:
  determining X, Y, and Z values for a set of three initial RGB primaries and a reference white point;
  transforming the three initial RGB primaries to reference RGB primaries by proportionately increasing the distances of the initial RGB primaries from the reference white point so as to span all colors to be represented in meta space; and
  determining a transformation from X, Y, and Z values to meta RGB coordinates that maps the three reference RGB primaries to respective points along the meta RGB coordinate axes with maximal coordinate values and the reference white point to a point in meta space having all three coordinates with maximal coordinate values;
the pair of chromaticity values, denoted t and d, are related to the meta RGB values according to the equations $$t = 2(R-G)/(2R+3G+2B) \text{ and}$$

$$d = (R+G-2B)/(2R+3G+2B); \text{ and}$$

the lightness value, designated V, is given by the equation $$V = (2R+3G+2B)/2; \text{ and}$$

the pair of chromaticity values are derived from t and d according to the equations $$r = (t^2+v^2)^{1/2}; \text{ and}$$

$$= \tan^{-1}(t/d).$$

17. A method of printing a color image on a reproducing printer having a first set of colorants with a first set of maximum chroma values so as to simulate the appearance of the same image on an original printer having a second set of colorants with a second set of maximum chroma values greater than the first set of maximum chroma values, the method comprising:
  defining a function of specified chroma value that falls off gradually to a value less than 100% for a specified chroma value of 100%, the value representing the ratio of one of the first maximum chroma values to a corresponding one of the second maximum chroma values;
  in response to specified hue and chroma values to be rendered by the reproducing printer, applying the function to the specified chroma value;
  determining colorant amounts for a color having the specified hue and the specified chroma, as possibly reduced by the function; and
  rendering a pixel in the image using the colorant amounts so determined.

18. A method of printing a color image on a reproducing printer having a first set of colorants so as to simulate the appearance of the same image on an original printer having a second set of colorants, the second set of colorants allowing a greater darkness value than allowed by the first set of colorants, the method comprising:
  defining a function of specified darkness value that falls off gradually to a value less than 100% for a specified darkness value of 100%, the value representing the ratio of first maximum darkness value to a the second maximum darkness value;
  in response to specified values to be rendered by the reproducing printer, applying the function to the specified darkness value;
  determining colorant amounts for a neutral color having the specified darkness, as possibly reduced by the function; and
  rendering a pixel in the image using the colorant amounts so determined for a neutral component.

* * * * *